Aug. 18, 1964    R. C. PARKINSON    3,145,361
POTENTIOMETRIC TRANSDUCER
Filed April 16, 1964    2 Sheets-Sheet 1
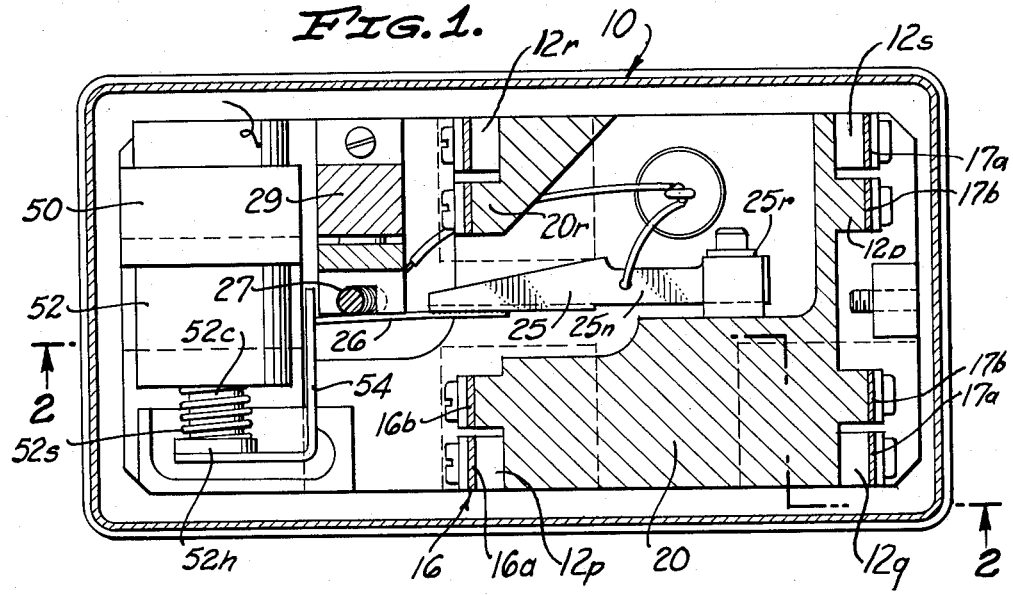
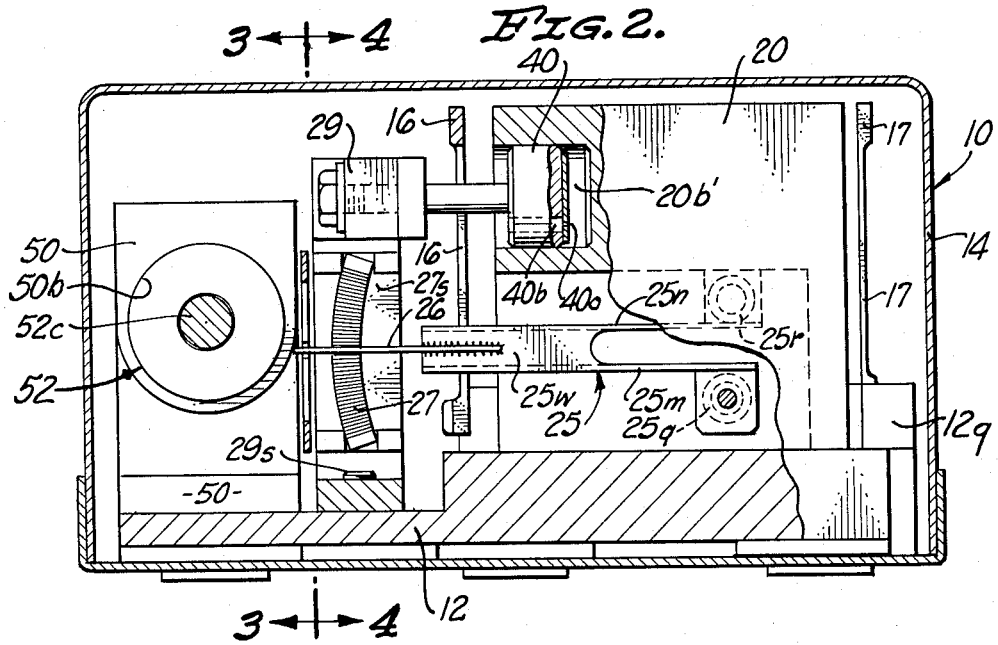
INVENTOR.
ROBERT C. PARKINSON
BY

INVENTOR.
ROBERT C. PARKINSON
BY

United States Patent Office 3,145,361
Patented Aug. 18, 1964

3,145,361
POTENTIOMETRIC TRANSDUCER
Robert C. Parkinson, Riverside, Calif., assignor to Bourns, Inc., a corporation of California
Filed Apr. 16, 1964, Ser. No. 360,342
4 Claims. (Cl. 338—46)

The invention hereinafter disclosed pertains to potentiometric transducers of the acceleration-sensing type, and more particularly to such transducers employing a suspended mass the movements of which, relative to structure from which the mass is suspended, are employed to move the potentiometer wiper contact along an exposed contact zone of the resistance element of the potentiometer whereby the potentiometer provides electrical indications of the axial component of the acceleration to which the transducer is subjected. A typical example of the type of potentiometric transducer to which the invention pertains is illustrated in copending application Serial No. 133,518, filed August 23, 1961, to which disclosure reference may be made for details not herein fully illustrated, and which disclosure is incorporated herein by reference.

In use of the mentioned prior art acceleration-sensitive potentiometric transducers it has been noted that it most often is desired to obtain a measure of the axial component of the acceleration experienced by the device under test, only occasionally, or at widely-spaced intervals of time. Further it is noted that due to lengthy continued contact of the wiper or contact on the resistance element during periods between which measurements were desired, and also during shipment and storage of such transducers, damaging and undesirable wear occurred, both of the contact and, more importantly, of an area of rest on the resistance element. Such wear resulted in lessened linearity at the least, and failure of the element at the worst.

The present invention provides means whereby the aforementioned disadvantages of prior art potentiometric transducers are obviated. Those attainments the invention achieves by provision of means which permit the wiper contact to come into engagement with the resistance element during only selected intervals of time chosen by an operator or operative means. According to the invention, the wiper and/or contact is so devised that it may be moved transversely toward and away from the contact surface of the resistance element, irrespective of movement by the transducer mechanism in the direction of the contact surface; and means are provided whereby the wiper contact is moved and held away from the resistance element contact surface during all periods of time excepting those during which measurements are required. Thus, for example, in a preferred exemplary form of apparatus the wiper contact is made resilient in the direction toward and from the contact surface, that is, transverse to the plane of the contact zone; and a device is provided that in normal inactive condition holds the contact away from the contact surface of the resistance element. The device, in response to an energizing signal, acts to permit the contact to move into brushing engagement with the resistance element, and at the termination of the signal the device returns the wiper contact to inactive position away from the resistance element. In the preferred exemplary embodiment of apparatus according to the invention the noted device is an electromagnet of the solenoid type having a core that is moved, together with an attachment, to inactive position by spring means and which when the coil is energized by an applied electric signal current, tenses the spring means and moves the attachment or "lifter" to a position in which the wiper is released and thus is permitted freedom to brush along the resistance element.

The preceding brief explanatory description of the invention makes it evident that it is a principal object of the invention to provide improvements in potentiometric transducers of the type noted, whereby wear between the wiper contact and the resistance element is prevented except when measurements are desired to be made.

An additional object of the invention is to provide simple, inexpensive means for preventing wear between the wiper contact and the resistance element of a potentiometric transducer when the transducer is not in use.

Other objects and advantages of the invention will be hereinafter stated in the appended claims or made evident in the following detailed description of the preferred exemplary embodiment of the invention as it is illustrated in the accompanying drawings comprised in the disclosure of the invention.

In the drawings:

FIGURE 1 is a view, partly in section, showing portions of an acceleration-sensitive structure and parts of a potentiometer driven by the acceleration-sensitive structure, with electro-magnet means and auxiliary means for moving and holding the potentiometer wiper contact off the resistance element with provision for releasing the wiper;

FIGURE 2 is a side view of the transducer illustrated in part in FIGURE 1, with parts broken away to show detail and some parts shown in section;

Figure 4:
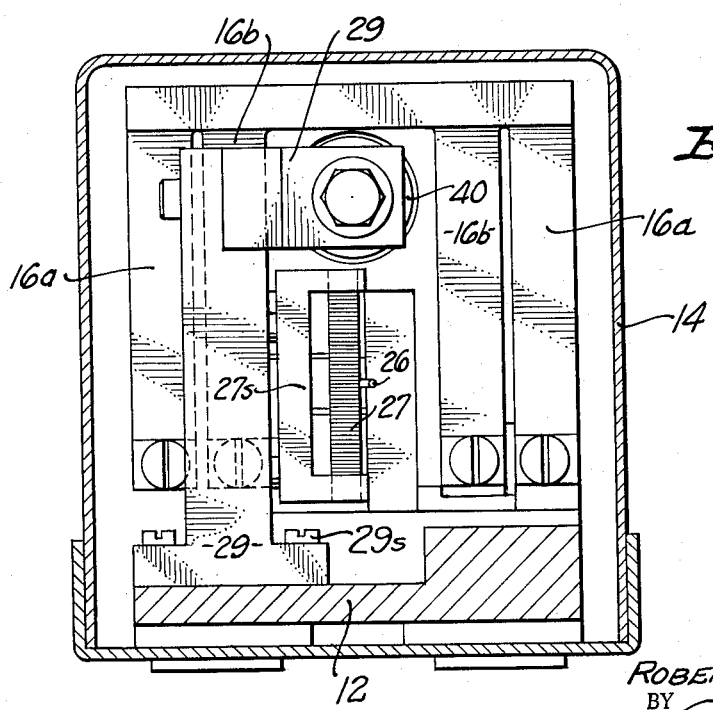
FIGURE 4 is a sectional view similar to that of FIGURE 3, but taken as indicated by broken line 4—4 of FIGURE 2.

Referring first to FIGURES 1 and 2, the potentiometric transducer, indicated generally by ordinal 10, comprises a frame means comprising a base 12 and a cover 14 of rectangular configuration and can-like construction. Supported upon four upstanding outer pedestal-like portions of base 12, such as portions 12p, 12q, 12r and 12s (FIGURE 1), are outer depending resilient limbs 16a and 17a of first and second mass-suspending springs 16 and 17, respectively. Each spring comprises a pair of outer depending limbs and a pair of inner depending limbs, all interconnected at the upper ends thereof by an integral bridging portion as illustrated in the aforementioned application Ser. No. 133,518. For example, spring 16 (FIGURE 4) comprises outer limbs 16a and inner limbs 16b all integral with and depending from a stiff connection bridge portion at the upper ends of the limbs. The lower ends of the two pairs of inner limbs of the two springs are secured to outstanding projections such as 20r (FIGURE 1) formed on shaped inertial mass 20, whereby the inertial mass is resiliently supported for reciprocatory linear motion relative to the base 12. The limbs of the springs are secured to the pedestals and projections of the base and the mass, respectively, by welding or by screws as indicated in FIGURE 4. Movements of the mass relative to the base are restricted to rectilinear movements in a direction perpendicular to the general planes of the springs. Such movements, to and fro with respect to an intermediate or rest position, are opposed by the resilient springs. Consequently, motion of the mass relative to the base is induced only by acceleration of the base in the noted direction. Further, the extent of such relative movement is a measure of the acceleration of the base in that direction, it being understood that motion and acceleration can be positive, or negative. The noted direction is that definitive of the sensitive axis of the potentiometric transducer, and is termed the axial direction for convenience.

Axial movement of the inertial mass in either the positive or negative sense is not only opposed by the suspending springs 16 and 17, but is damped by dashpot means (FIGURE 2) comprising a fixed piston 40 and a cylinder 20b'. The cylinder is conveniently a bore formed in the inertial mass; and the piston is secured to a stand 29 attached to base 12 as by screws 29s, all as indicated in the drawings. The piston is produced with a bore 40b whereby fluid may pass therethrough, and the passage provided by the bore is restricted by a plate sealed over the end of the piston and which plate has a sharp-edge orifice 40o therethrough disposed in alignment with bore 40b. A body of fluid, which may be a portion of a body of liquid such as oil or silicone of low viscosity with which the instrument case is filled, is forced through the restricted orifice of the piston incident to relative movement of the inertial mass and base 12.

Any movement of the inertial mass relative to the base thus represents the axial component of an acceleration to which the base or support means has been subjected. Such a movement is translated by the electrical elements of the potentiometer device into an electrical representation of the movement. To that end a stationary or fixed resistance element 27 is insulatively supported on the stand 29 by way of an insulation block 27s that is secured to the stand and on which block the resistance element is affixed by suitable means such as adhesive. Also, a movable electrical element in the form of a resilient wiper contact 26 disposed to wipe along an exposed zone of the resistance element is secured to a motion-amplifying arm 25 for movement thereby in either direction from a middle, inactive, or rest, position. Arm 25 comprises a rigid section 25w and first and second resilient limbs 25m and 25n that preferably are integral flat extensions of flanges provided as parts of the rigid portion of the arm. The free end of limb 25m is anchored to a part of frame means 12 as at 25q, and the free end of limb 25n is secured at 25r to a face provided on inertial mass 20 to move therewith. Thus as the condition-sensing instrumentality provided by the inertial mass moves relative to the frame, the limbs 25m and 25n are forced to bend or flex, with the consequence that wiper contact 26 brushes along the contact zone of resistance element 27 a distance much greater than the corresponding distance moved by mass 20. Thus relatively small movements of mass 20 with respect to frame 12 are in effect amplified or multiplied by the action of arm 25; and the multiplying effect is augmented by the radius or sweep motion of the wiper contact 26.

The thus far enumerated structures are or may be like or similar to those shown and described in the aforementioned application Ser. No. 133,518, with the exception of the resilient wire-like contact 26. As previously indicated, the contact is made resilient whereby it may be selectively and controllably forced out of contact with the resistance element and permitted to spring back into such contact. To that end, contact 26 is extended beyond the resistance element 27 and means are provided to engage the tip end of the contact and spring or lift the contact away from the element, as indicated in FIGURE 1. The noted novel means will next be described.

Figure 3:
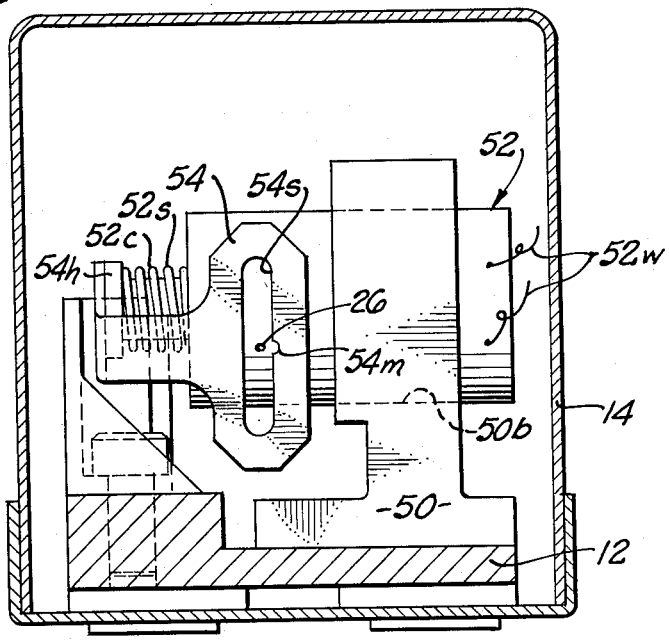
FIGURE 3 is a sectional view of means depicted in FIGURE 1, the section being taken as indicated by broken line 3—3 in FIGURE 2.

Referring to FIGURES 2 and 3, there is affixed to base 12 at an extended end thereof an upright support 50 having a transverse bore 50b in which is secured as by adhesive an electromagnet 52 of the solenoid type. The electromagnet comprises a plunger-type armature or core 52c that is normally held in the extended and inactive position by auxiliary means such as a compression spring 52s that encircles the core between the coil case of the magnet and the head 52h of the armature or core. Energization of the coil of the magnet causes movement inward of the core and compression of the spring, as indicated in FIGURES 1 and 3. Subsequent de-energization of the coil permits the spring to return the core outwardly to the inactive position.

Attached to the head 52h of the reciprocatory core of the electromagnet is a mechanical actuator or means in the form of a bent plate 54 that is arranged to engage and move the wire contact 26 out of engagement with resistance element 27. To that end plate 54 is bent to have a portion lie alongside the electromagnet and adjacent to the resistance element, as indicated in FIGURES 1 and 2; and the latter portion is provided with a slot 54s (FIGURE 3) so disposed that a portion of the resilient contact 26 extends through the slot. Further, the slot is so disposed that when the electromagnet coil is energized and core 52c is drawn in and spring 52s compressed as indicated in FIGURE 3, the contact 26 is disposed in resilient brushing engagement with resistance element 27 and free to move to and fro along the length of slot 54s out of contact with the plate 54. Thus during periods of intervals characterized by energization of the coil of the magnet the resilient contact rests in brushing engagement with the resistance element and during those periods the potentiometer is enabled and effective to provide indications of movement of mass 20 relative to frame means 12. That position of the contact 26 is, in most instances, a temporary position assumed during only such times as a potentiometric indication is desired.

As is evident, as soon as the electromagnet is thereafter permitted to become de-energized, spring 52s will expand and move the armature and the mechanical lifter provided by plate 54 from the temporary position indicated in FIGURE 3 to the respective normal inactive position; and that movement will cause plate 54 to engage contact 26 and lift or move the contact out of engagement with the resistance element. Thus power is consumed and heat is generated by the magnet coil and in the resistance element only during those periods when an indication is desired and the magnet is energized; and during the intervening intervals of time, consumption of current is nil and wearing of the contact and the resistance element is prevented. Thus it is seen that harmful deterioration and wearing of both the resistance and the element are avoided during shipment, during storage, and during periods of time when the potentiometer transducer is attached to a machine but representations of the measured physical quantity are not required. As is evident, in the case of a severely vibrating machine the wearing could be catastrophic or at least such as to result in serious errors.

The preceding description of a preferred exemplary potentiometric transducer embodying the principles of the invention indicates full attainment of the aforementioned objects of the invention. In the light of the disclosure of the exemplary illustrative transducer, modifications and changes within the true spirit and scope of the invention will occur to others skilled in the art. Accordingly it is not desired to restrict the invention to exact details of the noted transducer but to limit the invention only as restricted by the prior art and according to the appended claims.

I claim:
1. An acceleration-sensing potentiometer comprising:
 first means, including frame means adapted to be subjected to acceleration;
 second means, including resilient spring means attached to said frame means and an inertial mass means resiliently supported by said spring means for movement in either of opposite directions relative to said frame means incident to acceleration of said frame means in one of said directions;
 third means, including a potentiometer having electrical elements including a resistance element and a resilient wiper contact element said elements arranged for brushing interengagement and one of said electrical elements being supported by said frame means to move therewith and the other of said electrical elements being connected to said inertial mass for movement thereby to cause brushing coaction between said elctrical elements;
 fourth means, including energizable electromagnet means having an armature means and auxiliary means whereby the armature means assumes first and second positions incident to energization and subsequent de-energization; and fifth means, including mechanical means operated by said fourth means, movable to first and second positions by said fourth means in response to energization and de-energization of said electromagnet means, said mechanical means incident to movement to one of said positions engaging one of said electrical elements and moving it out of brushing interengagement with the other of said electrical elements and incident to movement to the other of said positions moving out of engagement with said one of said electrical elements and thus permitting return of said electrical elements into brushing interengagement, whereby brushing interengagement of said electrical elements can be controlled by said third means and restricted to time intervals during which sensing of acceleration of said first means is desired and whereby wear of said electrical elements during intervening time intervals is avoided.

2. An acceleration-sensing potentiometer according to claim 1, said resilient wiper contact element being a resilient wire and said mechanical means comprising a slotted plate through the slot of which the said wire extends and in which slot the wire is free to be moved in brushing contact with said resistance element incident to movement of said slotted plate to said one of said positions by energization of said electromagnet, and said plate being moved to move said wire away from said element incident to de-energization of said electromagnet.

3. A condition-sensing potentiometer adapted to provide potentiometric representations of the magnitude of the condition and comprising:

first means, including support means, a condition-sensing instrumentality and a potentiometer connected to and actuated by the instrumentality and said potentiometer comprising a resistance element fixedly supported on said support means and a wiper device having a resilient wire-like contact, said wiper device being connected to said instrumentality to be driven thereby to brush said contact along a contact zone of said resistance element, and said wire-like contact having a portion thereof extending transversely of and away from said resistance element;

second means, including an electromagnet connected to and supported by said first means and having a coil and an armature movable between first and second positions in response to energization and de-energization of said coil; and third means, including mechanical means connected to said armature means and moved thereby from a normal position in engagement with said contact to a temporary position out of engagement with said contact incident to energization of said coil and from said temporary position to said normal position in response to de-energization of said coil, said mechanical means in moving from said normal position to said temporary position engaging said contact and moving the contact out of electrical brushing contact with said resistance element, whereby by energizing said coil said potentiometer may be made effective to provide representations of the currently existing magnitude of said condition and whereby by thereafter causing de-energization of said coil said potentiometer is made ineffective and wearing of said contact and resistance element is prevented during intervals when representations are not desired.

4. A potentiometer according to claim 3, in which said condition-sensing instrumentality comprises an inertial mass and resilient means suspending said mass from said support means and in which said contact is connected to said inertial mass to be moved thereby incident to relative movement between said support means and said mass.

References Cited in the file of this patent
UNITED STATES PATENTS

| | | |
|---|---|---|
| 2,640,900 | Klose | June 2, 1953 |
| 2,702,186 | Head et al. | Feb. 15, 1955 |
| 2,945,378 | Martin | July 19, 1960 |
| 2,959,459 | Ryan | Nov. 8, 1960 |
| 2,997,678 | Gibbs | Aug. 22, 1961 |
| 3,010,324 | Pitzer | Nov. 28, 1961 |